United States Patent
Kwon et al.

(10) Patent No.: US 8,315,752 B2
(45) Date of Patent: Nov. 20, 2012

(54) APPARATUS AND METHOD FOR CONTROLLING MOTOR POSITION AND CREEP OF ELECTRIC VEHICLE

(75) Inventors: Sang Uk Kwon, Gyeonggi-Do (KR); Seo Ho Choi, Seoul (KR); Soon Woo Kwon, Gyeonggi-do (KR); Kyu Il Lee, Gyeonggi-Do (KR); Joon Yong Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 457 days.

(21) Appl. No.: 12/625,220

(22) Filed: Nov. 24, 2009

(65) Prior Publication Data

US 2011/0029172 A1 Feb. 3, 2011

(30) Foreign Application Priority Data

Jul. 30, 2009 (KR) .................. 10-2009-0069756
Jul. 30, 2009 (KR) .................. 10-2009-0069758
Jul. 30, 2009 (KR) .................. 10-2009-0069759

(51) Int. Cl.
*B60L 15/20* (2006.01)
*B60W 10/04* (2006.01)
(52) U.S. Cl. ........................................ 701/22; 318/452
(58) Field of Classification Search .......... 701/22, 701/36; 477/3; 318/452
See application file for complete search history.

(56) References Cited

U.S. PATENT DOCUMENTS

| | | | | |
|---|---|---|---|---|
| 5,376,869 A * | 12/1994 | Konrad | .................. | 318/587 |
| 5,457,363 A * | 10/1995 | Yoshii et al. | .................. | 318/432 |
| 6,278,916 B1 * | 8/2001 | Crombez | .................. | 701/22 |
| 6,377,007 B1 * | 4/2002 | Ozaki et al. | .................. | 318/432 |
| 6,755,489 B2 * | 6/2004 | Kuno et al. | .................. | 303/191 |
| 7,909,730 B2 * | 3/2011 | Schwarz et al. | .................. | 477/93 |
| 8,010,270 B2 * | 8/2011 | Ueoka et al. | .................. | 701/70 |

FOREIGN PATENT DOCUMENTS

| | | |
|---|---|---|
| JP | 10-184411 A | 7/1998 |
| JP | 2000-127928 A | 5/2000 |
| JP | 2002-010407 A | 1/2002 |
| KR | 10-0273518 | 9/2000 |
| KR | 10-2005-0064975 | 6/2005 |
| KR | 10-2008-0077270 | 8/2008 |

* cited by examiner

*Primary Examiner* — Tan Q Nguyen
(74) *Attorney, Agent, or Firm* — Edwards Wildman Palmer LLP; Peter F. Corless

(57) ABSTRACT

The present invention provides an apparatus and method for controlling motor position and creep of an electric vehicle, in which when a running vehicle is stopped, motor position control for maintaining the vehicle in the stopped position even when a brake pedal is released is performed, and then creep torque control is performed such that the vehicle is prevented from rolling backwards and suddenly starting when the vehicle is restarted after a stop on a slope.

34 Claims, 13 Drawing Sheets

$M\ddot{x} = \Sigma F_i = mg\sin\theta - \mu mg\cos\theta \; \text{sign}(\dot{x})$ m : Mass, g : Gravity acceleration, $\theta$ : Slope angle
$\mu$ : Rolling resistance coefficient, x : Displacement
sign(x): 1 if x>0 / -1 if x<0

APPARATUS AND METHOD FOR CONTROLLING MOTOR POSITION AND CREEP OF ELECTRIC VEHICLE

CROSS-REFERENCE TO RELATED APPLICATION

This application claims under 35 U.S.C. §119(a) the benefit of Korean Patent Application No. 10-2009-0069756, Korean Patent Application No. 10-2009-0069758, and Korean Patent Application No. 10-2009-0069759, filed on Jul. 30, 2009, the entire contents of which are incorporated herein by reference.

BACKGROUND (a) Technical Field

The present disclosure relates, generally, to an apparatus and method for controlling motor position and creep of an electric vehicle.

(b) Background Art

In a typical gasoline engine vehicle, the idle torque of an engine is transmitted to a torque converter and a transmission even when an accelerator pedal and a brake pedal are not depressed while the vehicle is running, and thus the vehicle runs in a creep mode (creep running) which allows the vehicle to slowly move at a low speed.

For example, as shown in FIG. 11, a vehicle running on a slope encounters a slope resistance of mgsinθ as well as a rolling resistance. Due to such a slope resistance, the vehicle is stopped on the slope by friction brake force generated by a driver's operation of the brake pedal, and then, upon release of the brake pedal, the vehicle may roll backwards.

To get out of this situation, the driver tries to prevent the vehicle from rolling backwards, by depressing the brake pedal again or depressing the accelerator pedal.

In order to eliminate the inconvenience of having to try to prevent the vehicle from rolling backwards on a slope, creep control technology has been introduced, which prevents the vehicle from rolling by maintaining a predetermined amount of friction brake even when the accelerator pedal and the brake pedal are not depressed, and then releases the friction brake when the driver depresses the accelerator pedal again to switch to a normal driving condition.

On the contrary, an electric vehicle equipped with a fuel cell runs only by a motor driving system (a motor, a decelerator, and wheels) without an engine. Thus, no idle torque is automatically generated by the motor when the vehicle is stopped, and no creep occurs, different from a gasoline engine vehicle.

Accordingly, it is necessary to implement a creep function by controlling motor torque in order to provide the creep function of the gasoline engine vehicle to the electric vehicle.

Preferably, a pure electric vehicle, such as a fuel cell vehicle, driven by a motor requires a creep control algorithm for generating a torque like an engine idle torque in order to offer the same driving feeling as a typical mass-produced gasoline vehicle. Along with the development of the creep control algorithm for improving driving feeling during creep running, the technology for preventing the vehicle from rolling backwards on a slope upon restart after a stop has been studied.

In examples of vehicles driven only by a motor, such as a fuel cell vehicle and an electric vehicle, the prevention of backward rolling on a slope can be implemented simply by controlling the motor driving force (for example, by a method of increasing a motor driving torque upon detection of a slope) without introducing any additional system.

For example, as shown in FIG. 10, it is possible to implement a method of detecting a slope by applying a slope angle sensor or a rolling determination algorithm to a fuel cell vehicle and an electric vehicle and increasing a motor torque based on the detection result. This method can be easily implemented because it is easy to control the motor driving force.

However, it is necessary to calculate the amount of motor torque required additionally, and the calculated amount should be varied depending on a number of variables, such as slope angle, number of passengers, etc. Therefore, many allowances and tests are needed.

In particular, in the case where a slope is detected while maintaining a conventional creep torque control logic, the method of increasing the creep torque command may have difficulties in calculating the correct amount of additional motor torque to be suitably increased and keeping the vehicle in a correct position. Further, if a given condition, such as the number of passengers, slope angle, etc., changes, the amount of motor torque has to be calculated again in order to maintain the vehicle position. Otherwise, the vehicle may roll backwards or rush forward too much.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus and method for controlling motor position and creep of an electric vehicle, in which, after a running vehicle is stopped, the vehicle enters a motor position control mode, regardless of whether the vehicle is on a flat ground or slope, to perform backlash compensation, motor position control for maintaining the vehicle in the stopped position upon release of a brake pedal and a motor position stabilization check are performed, and then creep torque control is performed such that the vehicle would not roll backwards on a slope even without the operation of a brake pedal or an accelerator pedal and, at the same time, the vehicle can suitably maintain the current position regardless of a change in slope angle, the number of passengers, etc.

In further preferred embodiments, the present invention provides an apparatus and method for controlling motor position and creep of an electric vehicle, in which, when a brake pedal is suitably released while the vehicle is stopped, motor position control for maintaining the vehicle in the stopped position or creep torque control is firstly performed based on slope angle measurement information, a motor position stabilization check while the vehicle is in the stopped position is suitably performed during the motor position control, and then the creep torque control is suitably performed such that the vehicle would not roll backwards on a slope even without the operation of a brake pedal or an accelerator pedal, the vehicle can suitably maintain the current position regardless of a change in slope angle, the number of passengers, etc., and then the vehicle is naturally switched to a creep torque mode.

In further preferred embodiments, the present invention provides an apparatus and method for controlling motor position and creep of an electric vehicle, in which, when a brake pedal is suitably released while the vehicle is stopped on a slope, a rolling determination logic is suitably executed to perform motor position control for maintaining the vehicle in the stopped position or creep torque control, motor position stabilization check while the vehicle is in the stopped position is suitably performed during the motor position control, and then the creep torque control is suitably performed such that the vehicle would not roll backwards on a slope even without the operation of a brake pedal or an accelerator pedal, the vehicle can maintain the current position regardless of any change in slope angle, number of passengers, etc., and the vehicle is naturally switched to a creep torque mode.

In one preferred embodiment, the present invention provides an apparatus for controlling motor position and creep of an electric vehicle, the apparatus preferably including a motor position determiner for suitably determining the duration of motor position control from the stop of the vehicle to a predetermined time after release of a brake pedal; a motor position controller for suitably maintaining the position of a motor by calculating a motor torque for suitably maintaining the position of the motor; and a creep torque controller for suitably generating a creep torque of the motor after a time delay and controlling the motor speed to be at a constant level.

In another preferred embodiment, the present invention preferably provides a method for controlling motor position and creep of an electric vehicle, the method preferably including a motor position control step of controlling backlash compensation to eliminate backlash when a brake pedal is suitably depressed during running and then applying a motor torque to maintain the position of a motor when the brake pedal is released; a motor position stabilization check step of checking whether to continue to maintain the motor position or to enter a creep torque control step after a predetermined time; and the creep torque control step of constantly increasing the motor torque from a stabilization torque for maintaining the motor position to a maximum creep torque.

In still another preferred embodiment, the present invention preferably provides an apparatus for controlling motor position and creep of an electric vehicle, the apparatus preferably including a slope determiner for suitably determining whether to enter a motor position control mode or a creep torque control mode based on detection information of a slope angle sensor detecting a slope angle of a traveling road upon release of a brake pedal after the vehicle is stopped; a motor position controller for suitably maintaining the position of a motor by calculating a motor torque; and a creep torque controller for generating a creep torque of the motor after a time delay and controlling the motor speed to be at a constant level.

In yet another preferred embodiment, the present invention provides a method for controlling motor position and creep of an electric vehicle, the method preferably including a slope determination step of determining whether to enter a motor position control step or a creep torque control step by measuring a slope angle of a traveling road and determining whether the slope angle is enough to make the vehicle roll backwards upon release of a brake pedal; the motor position control step of entering the creep torque control step if the slope angle is less than a reference slope angle for the slope determination and then suitably increasing the motor torque to maintain the motor position if the slope angle is greater than the reference slope angle for the slope determination; a motor position stabilization check step of checking whether to continue to maintain the motor position or to enter the creep torque control step after a predetermined time; and the creep torque control step of constantly increasing the motor torque from a stabilization torque for suitably maintaining the motor position to a maximum creep torque.

In still yet another preferred embodiment, the present invention provides an apparatus for controlling motor position and creep of an electric vehicle, the apparatus preferably including a rolling determiner for suitably determining whether or not the vehicle is rolling backwards upon release of a brake pedal after the vehicle is stopped; a motor position controller for suitably maintaining the position of a motor by calculating a motor torque; and a creep torque controller for suitably generating a creep torque of the motor after a time delay and controlling the motor speed to be at a constant level.

In a further preferred embodiment, the present invention provides a method for controlling motor position and creep of an electric vehicle, the method preferably including a rolling determination step of determining whether or not the vehicle is rolling backwards upon release of a brake pedal; a motor position control step of entering a creep torque control step if it is determined that the vehicle is not rolling backwards and suitably applying a torque for maintaining the position of a motor if it is determined that the vehicle is rolling backwards; a motor position stabilization check step of checking whether to continue to maintain the motor position or to enter the creep torque control step after a predetermined time; and the creep torque control step of constantly increasing the motor torque from a stabilization torque for maintaining the motor position to a maximum creep torque.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
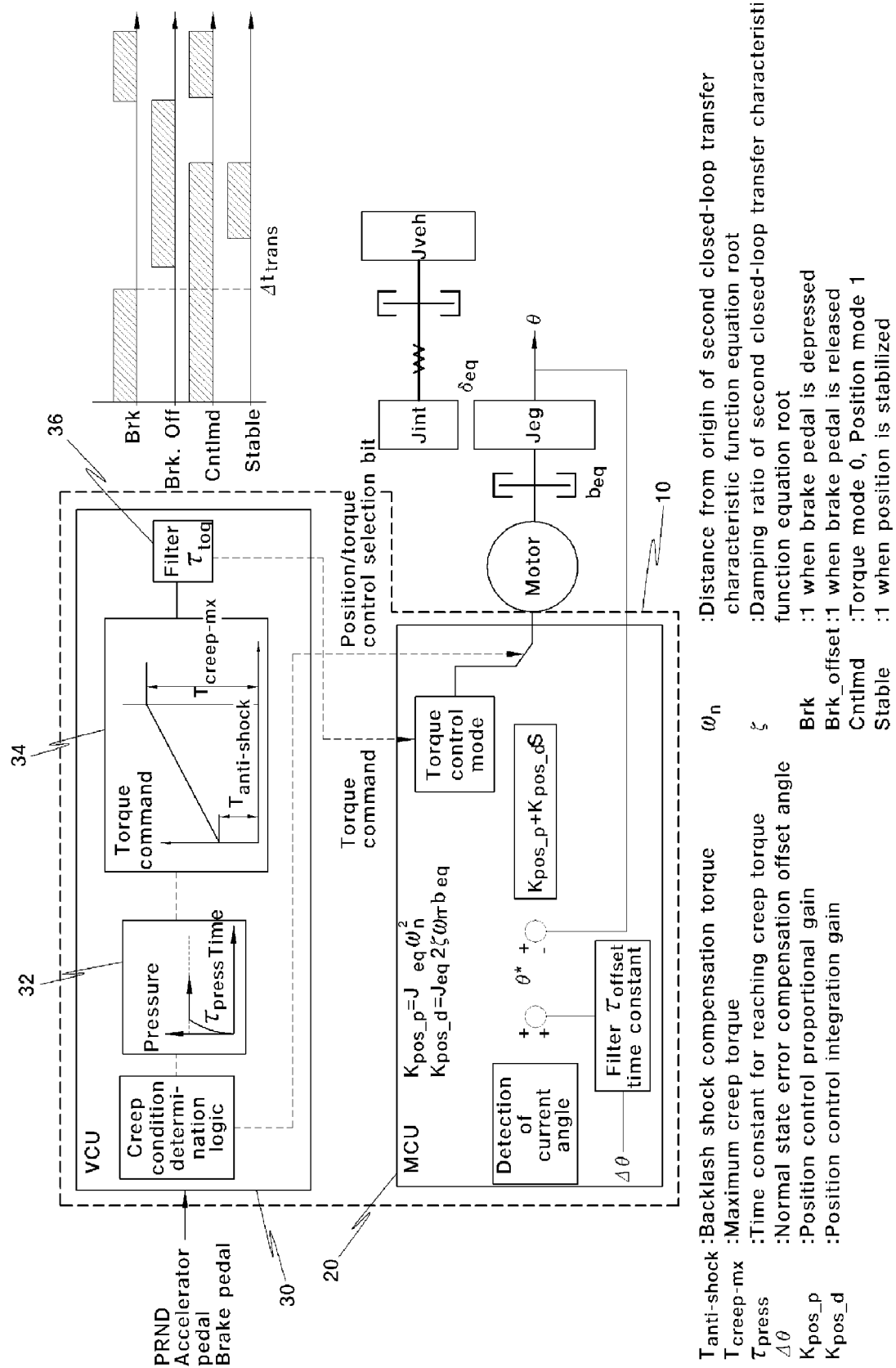
FIG. 1 is an exemplary control block diagram illustrating an apparatus for controlling motor position and creep of an electric vehicle in accordance with a first embodiment of the present invention.

Reference numerals set forth in the Drawings includes reference to the following elements as further discussed below:

| | |
|---|---|
| 10: apparatus for controlling motor position and creep | |
| 20: motor position controller | 30: creep torque controller |
| 32: torque converter hydraulic pressure formation modeling unit | |
| 34: torque converter normal state modeling unit | |
| 36: filter | 40: slope determiner |
| 50: slope angle sensor | 60: rolling determiner |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes an apparatus for controlling motor position and creep of an electric vehicle, the apparatus comprising a motor position determiner for determining the duration of motor position control from the stop of the vehicle to a time after release of a brake pedal, a motor position controller for maintaining the position of a motor by calculating a motor torque for maintaining the position of the motor, and a creep torque controller for generating a creep torque of the motor.

In one embodiment, the creep torque controller generates a creep torque after a time delay and controls the motor speed to be at a constant level.

In another aspect, the invention features a method for controlling motor position and creep of an electric vehicle, the method comprising a motor position control step, a motor position stabilization check step; and a creep torque control step.

In one embodiment, the motor position control step comprises controlling backlash compensation to eliminate backlash when a brake pedal is depressed during running and then applying a motor torque to maintain the position of a motor when the brake pedal is released.

In another embodiment, the motor position stabilization check step comprises checking whether to continue to maintain the motor position or to enter a creep torque control step after a predetermined time.

In one embodiment, the creep torque control step comprises constantly increasing the motor torque from a stabilization torque for maintaining the motor position to a maximum creep torque.

In another aspect, the invention features an apparatus for controlling motor position and creep of an electric vehicle, the apparatus comprising a slope determiner for determining whether to enter a motor position control mode or a creep torque control mode based on detection information of a slope angle sensor detecting a slope angle of a traveling road upon release of a brake pedal after the vehicle is stopped, a motor position controller for maintaining the position of a motor by calculating a motor torque; and a creep torque controller for generating a creep torque of the motor after a time delay and controlling the motor speed to be at a constant level.

In another aspect, the invention features a method for controlling motor position and creep of an electric vehicle, the method comprising a slope determination step of determining whether to enter a motor position control step or a creep torque control step by measuring a slope angle of a traveling road and determining whether the slope angle is enough to make the vehicle roll backwards upon release of a brake pedal, the motor position control step of entering the creep torque control step if the slope angle is less than a reference slope angle for the slope determination and increasing the motor torque to maintain the motor position if the slope angle is greater than the reference slope angle for the slope determination, a motor position stabilization check step of checking whether to continue to maintain the motor position or to enter the creep torque control step after a predetermined time; and a creep torque control step of constantly increasing the motor torque from a stabilization torque for maintaining the motor position to a maximum creep torque.

In another aspect, the invention features a method for controlling motor position and creep of an electric vehicle, the method comprising a rolling determination step, a motor position control step, a motor position stabilization check step, and a creep torque control step.

In one embodiment, the rolling determination step comprises determining whether or not the vehicle is rolling backwards upon release of a brake pedal.

In another embodiment, the motor position control step comprises entering a creep torque control step if it is determined that the vehicle is not rolling backwards and applying a torque for maintaining the position of a motor if it is determined that the vehicle is rolling backwards.

In one embodiment, the motor position stabilization check step comprises of checking whether to continue to maintain the motor position or to enter the creep torque control step after a predetermined time.

In another embodiment, the creep torque control step comprises constantly increasing the motor torque from a stabilization torque for maintaining the motor position to a maximum creep torque.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In a preferred embodiment, an apparatus and method for controlling motor position and creep of an electric vehicle in accordance with the present invention are described below.

FIG. 1 is a control block diagram illustrating an apparatus for controlling motor position and creep of an electric vehicle in accordance with a preferred embodiment of the present invention.

Preferably, the present invention provides a motor position closed-loop control to suitably maintain the position of a motor (motor rotor) when a vehicle runs on a slope while making up for the disadvantages of a conventional motor torque open-loop control. Preferably, in the motor position closed-loop control, when the vehicle is stopped after a brake pedal is depressed, the vehicle is automatically switched to a position control mode in which a motor torque for maintaining the current position by an appropriate control, such as PID control, PD control, etc. is automatically calculated based on the current position of the motor and the motor torque is used to suitably maintain the position of the vehicle.

According to certain preferred embodiments, the apparatus 10 for controlling the motor position and creep of an electric vehicle in accordance with the present invention preferably comprises a motor position control determiner, a motor position controller 20, and a creep torque controller 30.

Preferably, the motor position determiner determines the duration of motor position control from the stop of the vehicle to a predetermined time after release of the brake pedal.

In further preferred embodiments, the motor position controller 20 suitably controls the motor position (motor rotor position) by setting a target input angle by adding a motor position angle at a point of time when entering a position control mode and a backlash compensation angle while the vehicle is stopped, and automatically calculating a motor torque for suitably maintaining the position of the vehicle, i.e., the position of the motor by inputting a difference between the motor position angle at the point of time when entering the position control mode and the target input angle into a PD controller.

In certain preferred embodiments, the creep torque controller 30 preferably comprises a torque converter hydraulic pressure formation modeling unit 32 for forming the same hydraulic pressure as an actual torque converter and a torque converter normal state modeling unit 34. Preferably, the torque converter hydraulic pressure formation modeling unit 32 generates a creep torque of the motor after a time delay when a driver removes his or her foot from the brake pedal while the vehicle is suitably stopped by depressing the brake pedal.

Accordingly, during the torque converter hydraulic pressure formation process by the torque converter hydraulic formation modeling unit 32, the creep torque of the motor appears after a time delay.

According to further preferred embodiments, the torque converter normal state modeling unit 34 preferably provides the characteristics that a motor torque transmission force suitably increases with an increase in a difference between the speeds of the input and output ends of the torque converter hydraulic pressure formation modeling unit 32. Preferably, the torque converter normal state modeling unit 34 serves to suitably decrease the torque according to an increase in speed in order to maintain the speed of the motor at a constant level and, as a result, adjust the motor creep torque to such a level that makes the motor speed constant.

In certain preferred embodiments, a filter 36 for adjusting the creep torque so as not to cause an abrupt change is additionally connected to the final torque output end of the creep torque controller 30.

Preferably, a method for controlling motor position and creep of an electric vehicle in accordance with preferred embodiments of the present invention based on the above-described configuration is described below.

Figure 2A:
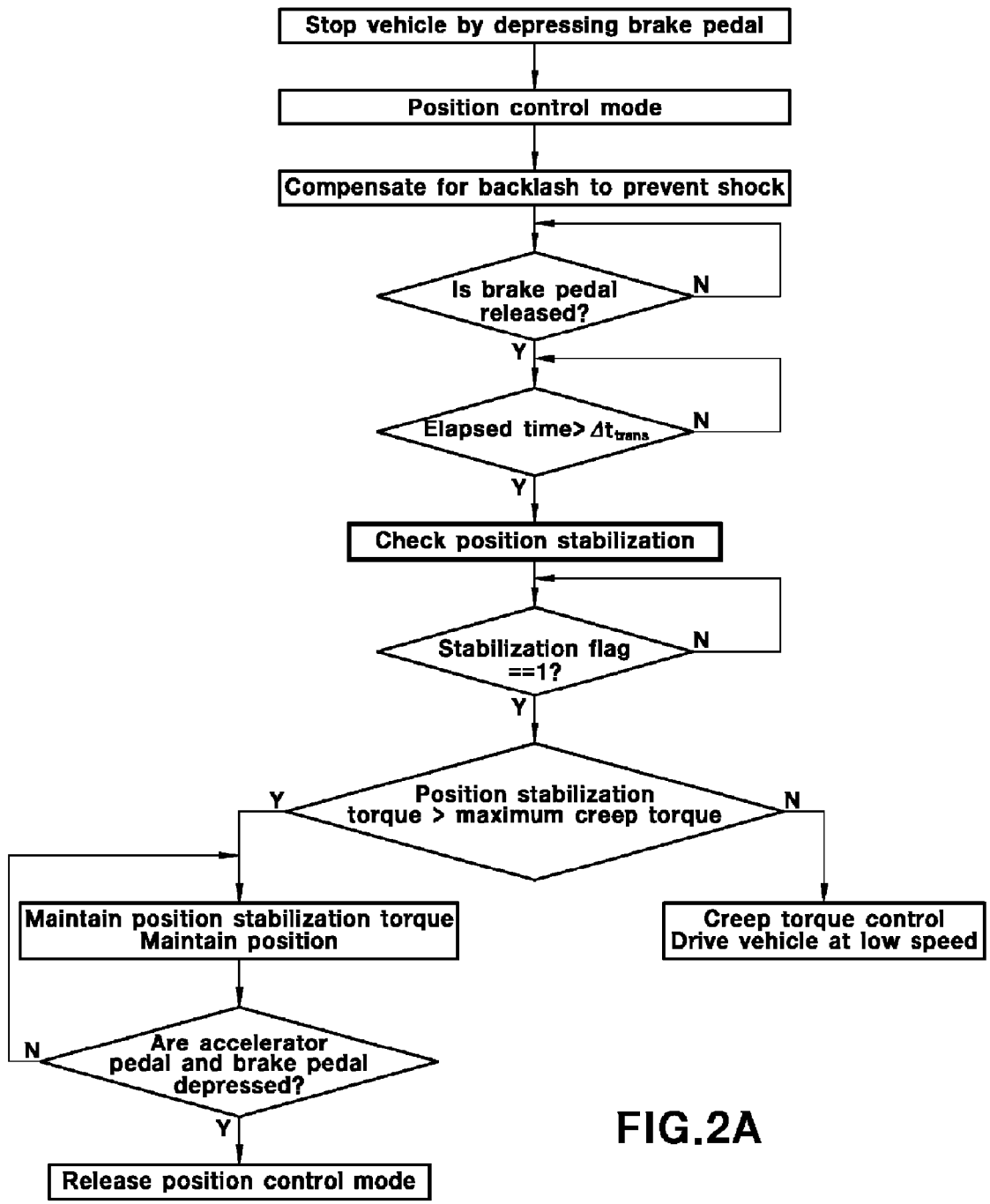
FIGS. 2A and 2B are flowcharts illustrating a method for controlling motor position and creep of an electric vehicle in accordance with the first embodiment of the present invention.
Figure 2B:
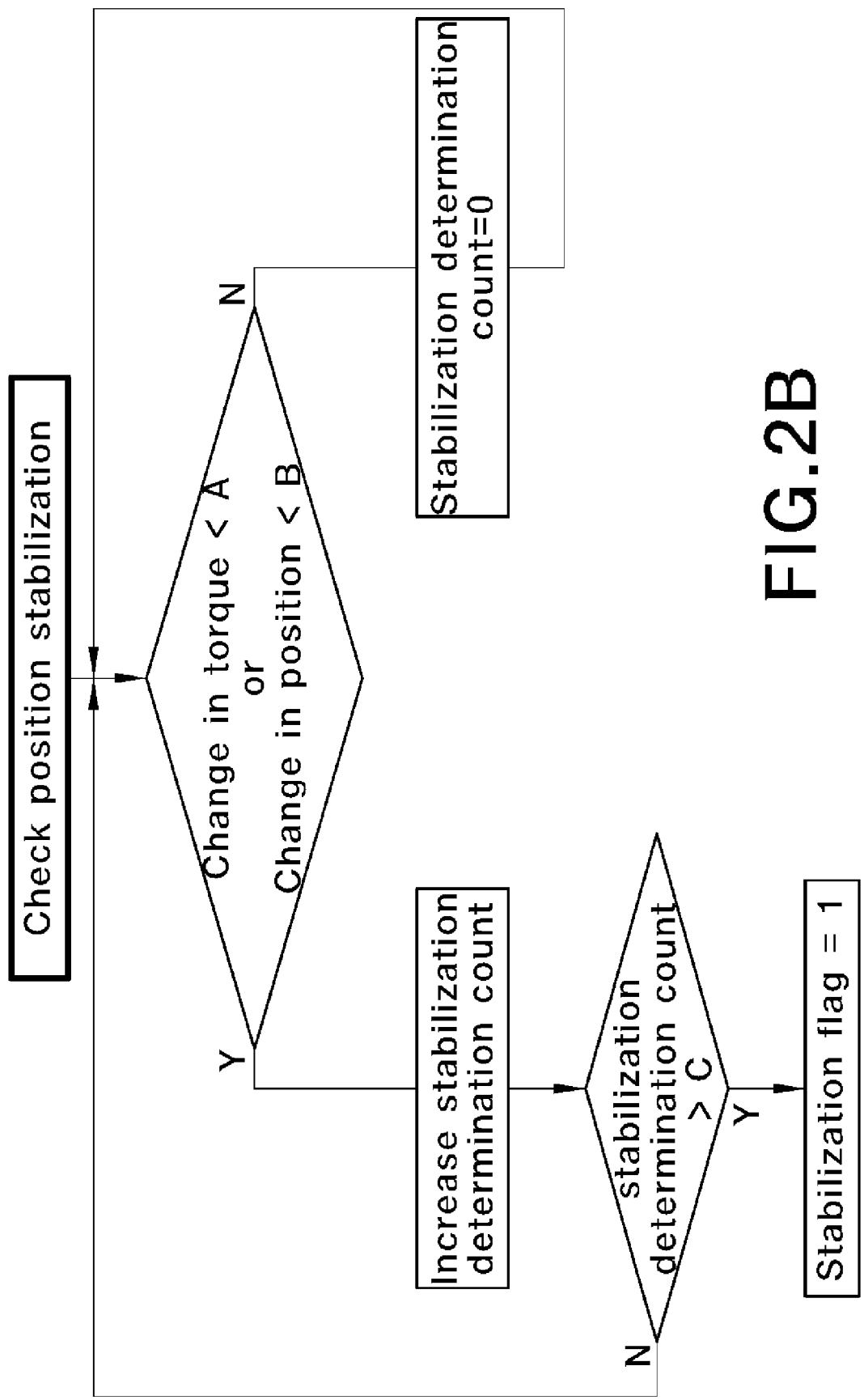
Figure 3:
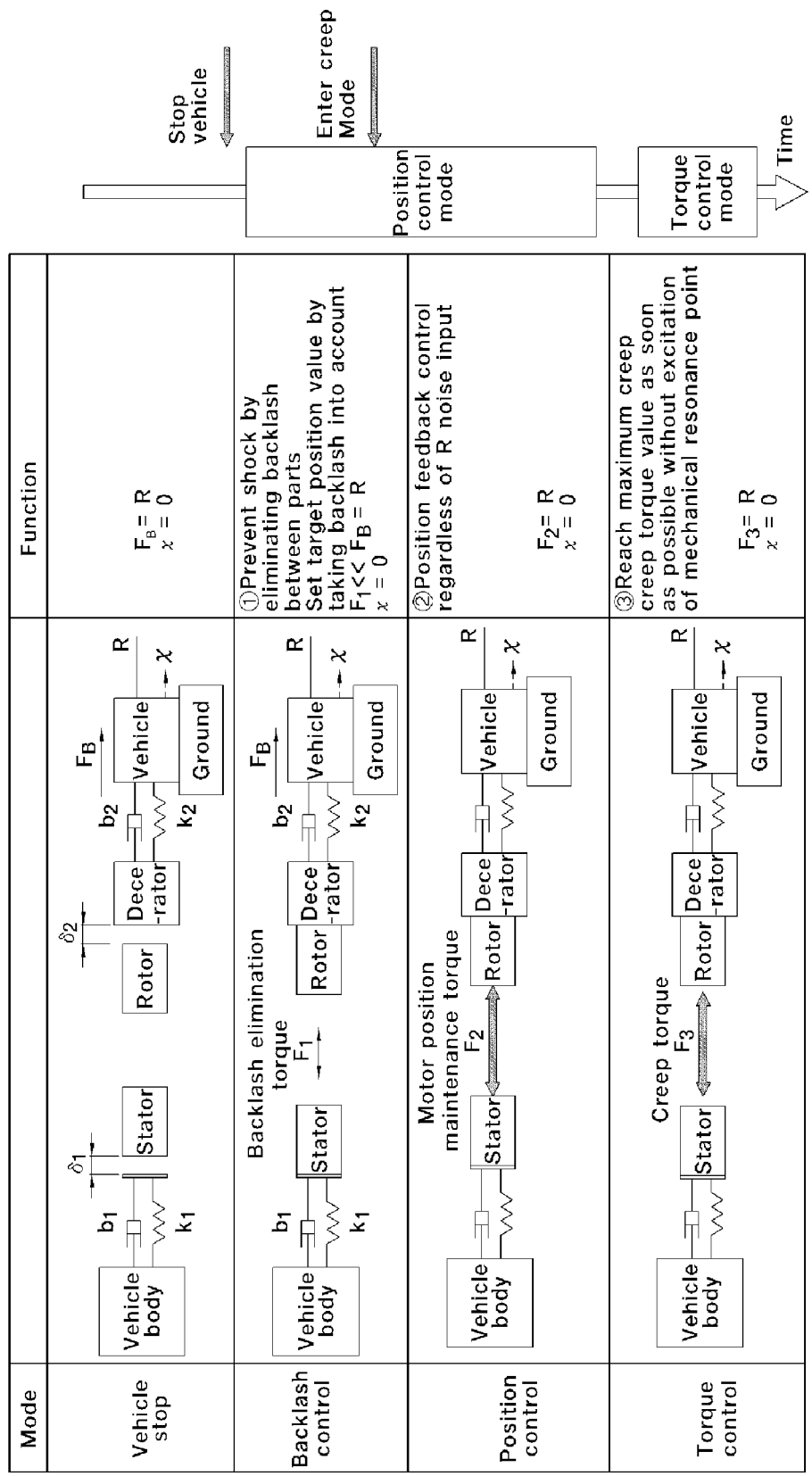
FIG. 3 is an exemplary control block diagram illustrating the method for controlling the motor position and creep of an electric vehicle with respect to control modes in accordance with the first embodiment of the present invention.

FIGS. 2A and 2B are flowcharts illustrating a method for controlling a creep running of an electric vehicle in accordance with a preferred embodiment of the present invention, and FIG. 3 is a control block diagram illustrating a method for controlling the creep running of an electric vehicle with respect to control modes in accordance with the first embodiment of the present invention, in which a change of control modes according to the lapse of time and a variation in motor driving torque according to the change of the control modes are shown.

Preferably, a logic for the following creep running control performed by the creep torque controller and the motor position controller is intended as an example, and various control logics can be suitably implemented as far as they have a creep torque generation mode and a motor position maintenance mode.

According to further exemplary embodiments, the present invention aims at preventing the vehicle from rolling backwards or suddenly starting on a slope without operating the brake pedal and the accelerator pedal, even in an electric vehicle driven only by a motor, by performing a step of unconditionally entering a motor position control mode upon stopping of the vehicle, a backlash compensation control step for eliminating backlash, a motor position control step of increasing the motor torque to maintain the motor position upon release of the brake pedal, a motor position stabilization check step, and a creep torque control step, thereby controlling the motor position and creep of the vehicle.

In a preferred embodiment, regardless of whether the vehicle is running on a flat ground or slope, if the brake pedal is suitably depressed during running, the vehicle enters the motor position control mode at the same time when the vehicle is stopped.

Preferably, the first control in the motor position control mode is the backlash compensation control step for eliminating backlash, in which a control for preventing a shock caused by the backlash is carried out.

Preferably, if a motor torque is abruptly applied when there is backlash between the motor and a decelerator or between the decelerator and driving wheels, an intense shock is applied toward the decelerator, which shakes the vehicle body, thus reducing the riding comfort. Accordingly, the motor position control is suitably carried out beforehand to compensate for the backlash when the vehicle is stopped.

Accordingly, in order to compensate for an error between the current angle of the motor and a normal state angle, which is caused by the backlash between the motor rotor and the decelerator, the motor position controller 20 sets a target input angle by adding a motor position angle at a point of time when entering a position control mode and a backlash compensation angle and, automatically calculates a motor torque for maintaining the position of the vehicle, i.e., the position of the motor by inputting a difference between the motor position angle at the point of time when entering the position control mode and the target input angle into a PD controller.

Accordingly, in further preferred embodiments, the motor torque for maintaining the position of the motor is suitably calculated and, more specifically, the motor torque is calculated by taking the backlash into account to prevent a shock when the calculated torque is applied.

Preferably, the motor torque for eliminating the backlash to compensate for the motor position error caused by the backlash occurring when the brake pedal is depressed, that is, the motor driving force (F1 in FIG. 3) is suitably required in a small amount to eliminate the backlash.

In further preferred embodiments, when the driver removes his or her foot from the brake pedal while the above-described control for preventing a shock caused by the backlash has been carried out, if the vehicle is on a slope, a slope load is produced abruptly. Accordingly, regardless of this slope load, the motor position control for suitably maintaining the stopped position of the vehicle, i.e., the current position of the motor is carried out to apply a torque required to maintain the current position of the motor, i.e., the torque calculated in the above manner.

Accordingly, upon release of the brake pedal, the motor position control step is suitably performed with the motor torque (for eliminating backlash) calculated to maintain the motor position.

Preferably, as the slope load is abruptly applied to the vehicle upon release of the brake pedal, the motor torque for maintaining the motor position during the motor position control mode, that is, the motor driving force (F2 in FIG. 3) is increased, thus allowing the vehicle to be continuously kept in the stopped state even on the slope.

In further preferred embodiments, the motor position determiner suitably determines the duration of the motor position control, and, if the duration of the motor position control is greater than a predetermined period of time, determines that the motor position control should be constantly performed.

Accordingly, after a predetermined period of time, the motor position stabilization check step is carried out in the following manner.

In certain exemplary embodiments, the motor position stabilization check step is preferably performed to check whether or not there is any change in motor torque and position and to determine whether to constantly maintain the current position of the vehicle, i.e., the current position of the motor or to switch to the creep torque control mode.

Preferably, for the motor position stabilization check, firstly, if the change in the motor torque is less than a motor torque stabilization reference value (A in FIG. 2) or if the change in the motor position is less than a motor position stabilization reference value (B in FIG. 2), a stabilization determination count is suitably increased. If the stabilization determination count is greater than a stabilization determination reference count value (C in FIG. 2), it is determined that the motor position is stably maintained.

Accordingly, the motor position stabilization check step is suitably started after release of the brake pedal, and if it is checked that the motor position is stably maintained, it is determined whether to switch to the creep torque control mode or not.

In certain exemplary embodiments, in the case where it is determined that the motor position is suitably stabilized, if a stabilization torque for maintaining the motor position is less than the maximum creep torque, the vehicle is suitably switched to the creep torque control mode, in which, as the motor torque slowly increases from the stabilization torque for maintaining the motor position to the maximum creep torque, the creep torque control is carried out.

In particular preferred embodiments, if the stabilization torque for maintaining the motor position is less than the creep torque, the vehicle is switched to the creep torque control step, in which, when the motor torque (F3 in FIG. 3) increases from the stabilization torque for maintaining the motor position to the maximum creep torque, the vehicle is slowly moved. In other preferred embodiments, in the case where the stabilization torque for maintaining the motor position is greater than the creep torque, the motor position is not changed but is continuously maintained.

Accordingly, the control for maintaining the motor position and the creep torque control are cancelled when the accelerator pedal or the brake pedal is suitably depressed.

Preferably, when the electric vehicle driven only by the motor runs on a slope, the current position of the vehicle, i.e., the position of the motor is correctly maintained regardless of the number of passengers or slope angle, and then the vehicle is switched to the creep torque control mode. Accordingly, even when the vehicle is restarted after a stop on a slope, it can run without rolling backwards or sudden starting, thereby greatly improving the driving performance.

Although the above motor position control is unconditionally carried out when the vehicle is running on a flat ground, the motor position stabilization time is shortened because there is no vehicle load on the flat ground, and therefore the vehicle is switched directly to the creep torque control mode. Hence, any particular problem will not occur during the control.

An apparatus and method for controlling the motor position and creep of an electric vehicle in accordance with a second embodiment of the present invention is described herein.

Figure 4:
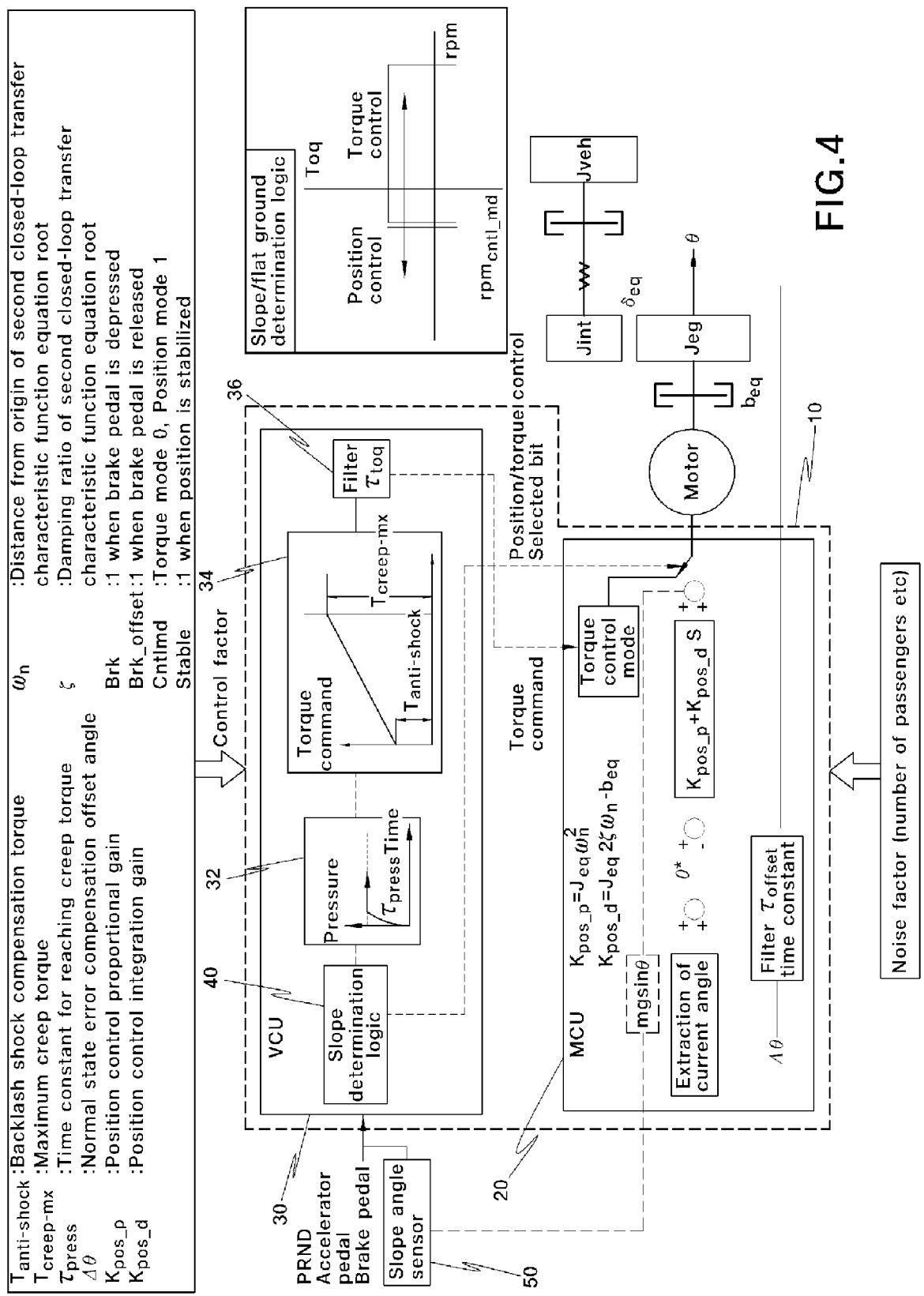
FIG. 4 is an exemplary control block diagram illustrating an apparatus for controlling motor position and creep of an electric vehicle in accordance with a second embodiment of the present invention.

FIG. 4 is a control block diagram illustrating an apparatus for controlling motor position and creep of an electric vehicle in accordance with preferred embodiments of the present invention.

In certain preferred embodiments, the present invention aims at providing a motor position closed-loop control method to suitably maintain the position of a motor (motor rotor) when a vehicle runs on a slope while making up for the disadvantages of a conventional motor torque open-loop control. Preferably, in the motor position closed-loop control, when the vehicle is stopped after a brake pedal is depressed, a shock prevention mode is performed to prevent a shock by applying backlash compensation torque and, at the same time, a slope determination logic is executed. Preferably, upon release of the brake pedal, the vehicle is automatically switched to a position control mode in which a motor torque for maintaining the current position by an appropriate control, such as PID control, PD control, etc. is automatically calculated based on the current position of the motor and the motor torque is used to maintain the position of the vehicle.

According to certain preferred embodiments, the apparatus 10 for controlling the motor position and creep of an electric vehicle in accordance with preferred embodiments of the present invention comprises a slope determiner 40 for calculating a slope angle of a traveling road based on a detection value of a slope angle sensor 50 and determining whether to enter a motor position control mode or a creep torque control mode, a motor position controller 20, and a creep torque controller 30.

Preferably, the slope determiner 40 suitably determines whether to enter the motor position control mode or the creep torque control mode depending on the slope angle of the traveling road on which the vehicle is traveling upon release of the brake pedal after the vehicle is stopped.

Preferably, the slope determiner 40 determines whether to enter the motor position control mode or the creep torque control mode based on detection information of the slope angle sensor upon release of the brake pedal after the vehicle is stopped. According to certain preferred embodiments, if the measured slope angle of the traveling road is less than a reference slope angle for the slope determination, the slope determiner 40 suitably determines to enter the creep torque control mode and, if the measured slope angle of the traveling road is greater than the reference slope angle for the slope determination suitably determines to enter the motor position control mode.

Preferably, the motor position controller 20 controls the motor position (motor rotor) by setting a target input angle by adding the current angle of the motor at a point of time when entering a motor position control mode and an offset angle for compensating for an angle error in a normal state and automatically calculating a motor torque for maintaining the position of the vehicle, i.e., the position of the motor by inputting a difference between the current angle and the target input angle into a PD controller.

According to further preferred embodiments of the present invention, the creep torque controller 30 comprises a torque converter hydraulic pressure formation modeling unit 32 for forming the same hydraulic pressure as an actual torque converter and a torque converter normal state modeling unit 34. Preferably, the torque converter hydraulic pressure formation modeling unit 32 generates a creep torque of the motor after a time delay when a driver removes his or her foot from the brake pedal while the vehicle is stopped by depressing the brake pedal.

Accordingly, during the torque converter hydraulic pressure formation process by the torque converter hydraulic formation modeling unit 32, the creep torque of the motor appears after a time delay.

Preferably, the torque converter normal state modeling unit 34 provides the characteristics that a motor torque transmission force increases with an increase in a difference between the speeds of the input and output ends of the torque converter hydraulic pressure formation modeling unit 32. According to further preferred embodiments, the torque converter normal state modeling unit 34 serves to decrease the torque according to an increase in speed in order to maintain the speed of the motor at a constant level and, as a result, adjust the motor creep torque to such a level that makes the motor speed constant.

Preferably, a filter 36 for adjusting the creep torque so as not to cause an abrupt change is additionally connected to the final torque output end of the creep torque controller 30.

A method for controlling motor position and creep of an electric vehicle in accordance with certain preferred embodiments of the present invention is described herein.

Figure 5:
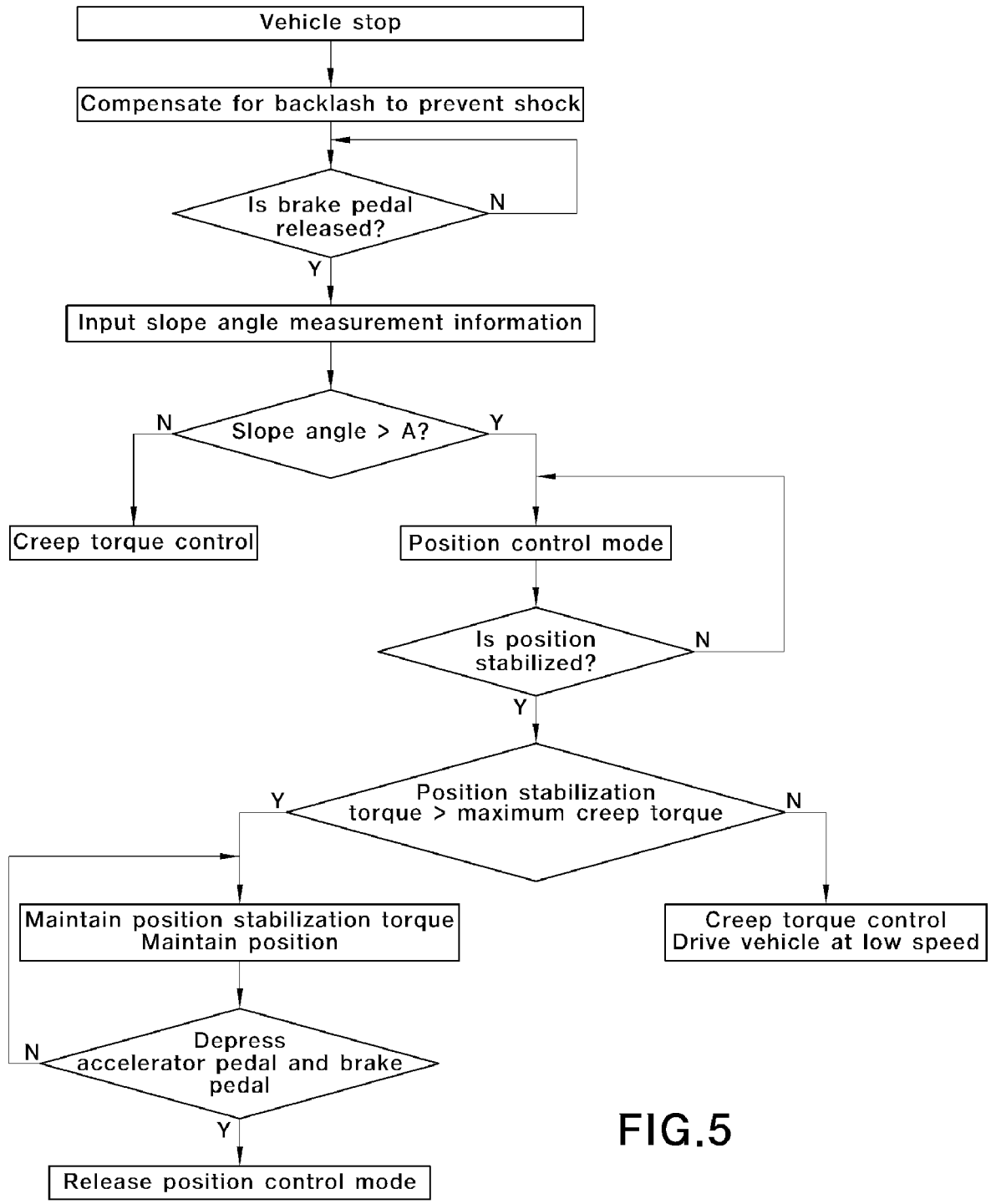
FIG. 5 is a flowchart illustrating a method for controlling motor position and creep of an electric vehicle in accordance with the second embodiment of the present invention.
Figure 6:
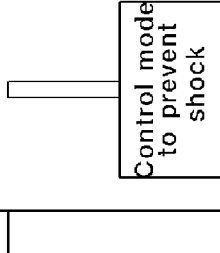
FIG. 6 is an exemplary control block diagram illustrating the method for controlling the motor position and creep of an electric vehicle with respect to control modes in accordance with the second embodiment of the present invention.

FIG. 5 is a flowchart illustrating a method for controlling a creep running of an electric vehicle in accordance with preferred embodiments of the present invention, and FIG. 6 is a control block diagram illustrating the method for controlling the creep running of an electric vehicle with respect to control modes in accordance with preferred embodiments of the present invention, in which a change in control modes according to the lapse of time and a variation in motor driving torque according to the change of the control modes are shown.

According to certain preferred embodiments, the present invention aims at preventing the vehicle from rolling backwards or suddenly starting on a slope without operating the brake pedal and the accelerator pedal, even in an electric vehicle driven only by a motor, by suitably performing a backlash compensation control step of eliminating backlash to prevent a shock caused by the backlash upon stopping of the vehicle when the brake pedal is depressed, a slope determination step of suitably determining whether to enter a motor position control mode or a creep torque control mode by measuring a slope angle of a traveling load upon release of the brake pedal, a motor position control step of increasing the motor torque to maintain the motor position upon release of the brake pedal if the slope angle is greater than a slope determination reference angle, a motor position stabilization check step, and a creep torque control step.

In a preferred embodiment, in the backlash compensation control step for unconditionally eliminating backlash upon stopping of the vehicle when the brake pedal is depressed while running on a slope, a control for preventing a shock caused by the backlash is suitably carried out.

Preferably, if a motor torque is abruptly applied when there is backlash between the motor and a decelerator or between the decelerator and driving wheels, an intense shock is applied toward the decelerator, which shakes the vehicle body, thus reducing the riding comfort. Accordingly, the motor position control is carried out beforehand to compensate for the backlash when the vehicle is stopped.

Accordingly, in order to compensate for an error between the current angle of the motor and a normal state angle, which is caused by the backlash between the motor rotor and the decelerator, that is, in order to eliminate the backlash upon stopping of the vehicle when the brake pedal is depressed during running, the backlash compensation control step including calculating a motor torque by taking the backlash into account to prevent a shock and applying a torque enough to eliminate the backlash to the motor is preferably performed.

Preferably, at this time, the motor torque for eliminating the backlash to compensate for the motor position error caused by the backlash occurring when the brake pedal is depressed, that is, the motor driving force (F1 in FIG. 6) is suitably required in a small amount to eliminate the backlash.

In a further preferred embodiment, when the driver removes his or her foot from the brake pedal while the control for preventing a shock caused by the backlash has been carried out, if the vehicle is on a slope, a slope load is produced abruptly. Accordingly, as a preceding step for preventing the vehicle from rolling backwards, the slope determination step is performed.

In further preferred embodiments, it is determined whether to enter the motor position control mode or the creep torque control mode based on detection information of the slope angle sensor upon release of the brake pedal. Preferably, if the slope angle is less than a reference slope angle for the slope determination, the vehicle enters the creep torque control mode, and if the slope angle is greater than the reference slope angle for slope determination, the vehicle enters the motor position control mode.

Preferably, when the brake pedal is suitably released, the slope information of the slope angle sensor is suitably received from the slope determiner. Further, if the slope angle is greater than a predetermined reference slope angle, the vehicle enters the creep torque control mode in advance before the vehicle rolls backwards, and if the slope angle is less than the predetermined reference slope angle, the motor position control for maintaining the motor position is suitably performed regardless of external load noise to generate a torque required to maintain the motor position, and a torque corresponding to a slope angle load is added in the following manner, thus stabilizing the motor position within a short time.

Accordingly, the motor position control mode includes a process of setting a target input angle by adding the current angle of the motor at a point of time when entering the motor position control mode and an offset angle for compensating for an angle error in a normal state, a process of calculating a motor torque for maintaining the position of the motor by inputting a difference between the current angle and the target input angle into a PD controller, and a process of applying a final motor torque, obtained by adding the calculated motor torque and a torque corresponding to a slope load value (mgsinθ) detected by the slope angle sensor and provided as a feedforward input to the motor.

Accordingly, regardless of the slope load that causes the vehicle to roll backwards on a slope, the stopped position of the vehicle, that is, the current position of the motor is suitably maintained.

Preferably, as the slope load is abruptly applied upon release of the brake pedal, the final motor torque calculated to maintain the motor position in the motor position control mode, that is, the motor driving force (F2 in FIG. 6) is suitably increased, thus allowing the vehicle to be continuously kept in the stopped state even on the slope.

In particular preferred embodiments, the slope angle, i.e., the slope load value (mgsinθ) detected by the slope angle sensor is provided as a feedforward input to the motor position controller for controlling the motor position such that the motor torque applied to the motor during the control for maintaining the motor position is added to the torque corresponding to the slope load value, thus stabilizing the motor position within a short time.

According to further preferred embodiments, the slope load value (mgsinθ) input as a feedforward value is suitably calculated based on the slope angle and the weight of the vehicle. Although the slope angle is continuously measured and a change in weight is not suitably detected, the change in weight, such as a change in the number of passengers, can be sufficiently compensated by a motor position feedback control.

In a further embodiment, after a predetermined time, the motor position stabilization check step is carried out in the following manner.

Preferably, the motor position stabilization check step is performed to check whether or not there is any change in motor torque and position and to suitably determine whether to constantly maintain the current position of the vehicle, i.e., the current position of the motor or to switch to the creep torque control mode.

Preferably, for the motor position stabilization check, firstly, if the change in the torque of the motor is less than a motor torque stabilization reference value or if the change in the position of the motor is less than a motor position stabilization reference value, a stabilization determination count is increased. In further preferred embodiments, if the stabilization determination count is greater than a stabilization determination reference count value, it is suitably determined that the motor position is stably maintained.

Accordingly, the motor position stabilization check step is started after release of the brake pedal, and if it is checked that the motor position is stably maintained, it is suitably determined whether to switch to the creep torque control mode or not.

Accordingly, in the case where it is suitably determined that the motor position is stabilized, if a stabilization torque for maintaining the motor position is less than the maximum creep torque, the vehicle is suitably switched to the creep torque control mode, in which, as the motor torque slowly increases from the stabilization torque for maintaining the motor position to the maximum creep torque, the creep torque control is carried out.

In further preferred embodiments, if the stabilization torque for maintaining the motor position is suitably less than the creep torque, the vehicle is switched to the creep torque control step, in which, when the motor torque (F3 in FIG. 6) increases from the stabilization torque for maintaining the motor position to the maximum creep torque, the vehicle is slowly moved. In other particular embodiments, in the case where the stabilization torque for maintaining the motor position is greater than the creep torque, the motor position is not changed but is continuously maintained.

In further related embodiments, the control for maintaining the motor position and the creep torque control are suitably cancelled when the accelerator pedal or the brake pedal is depressed.

Accordingly, when the electric vehicle driven only by the motor runs on a slope, the backlash elimination is suitably performed upon stopping, and the motor position control or the creep torque control is performed according to the slope determination upon release of the brake pedal. In particular, the current position of the vehicle, i.e., the position of the motor is correctly maintained regardless of the number of passengers or slope angle, and then the vehicle is switched to the creep torque control mode. Accordingly, in preferred embodiments of the present invention, even when the vehicle is restarted after a stop on a slope, it can run without rolling backwards or sudden start, thereby greatly improving the driving performance.

An apparatus and method for controlling motor position and creep of an electric vehicle in accordance with further preferred embodiments of the present invention is described herein.

Figure 7:
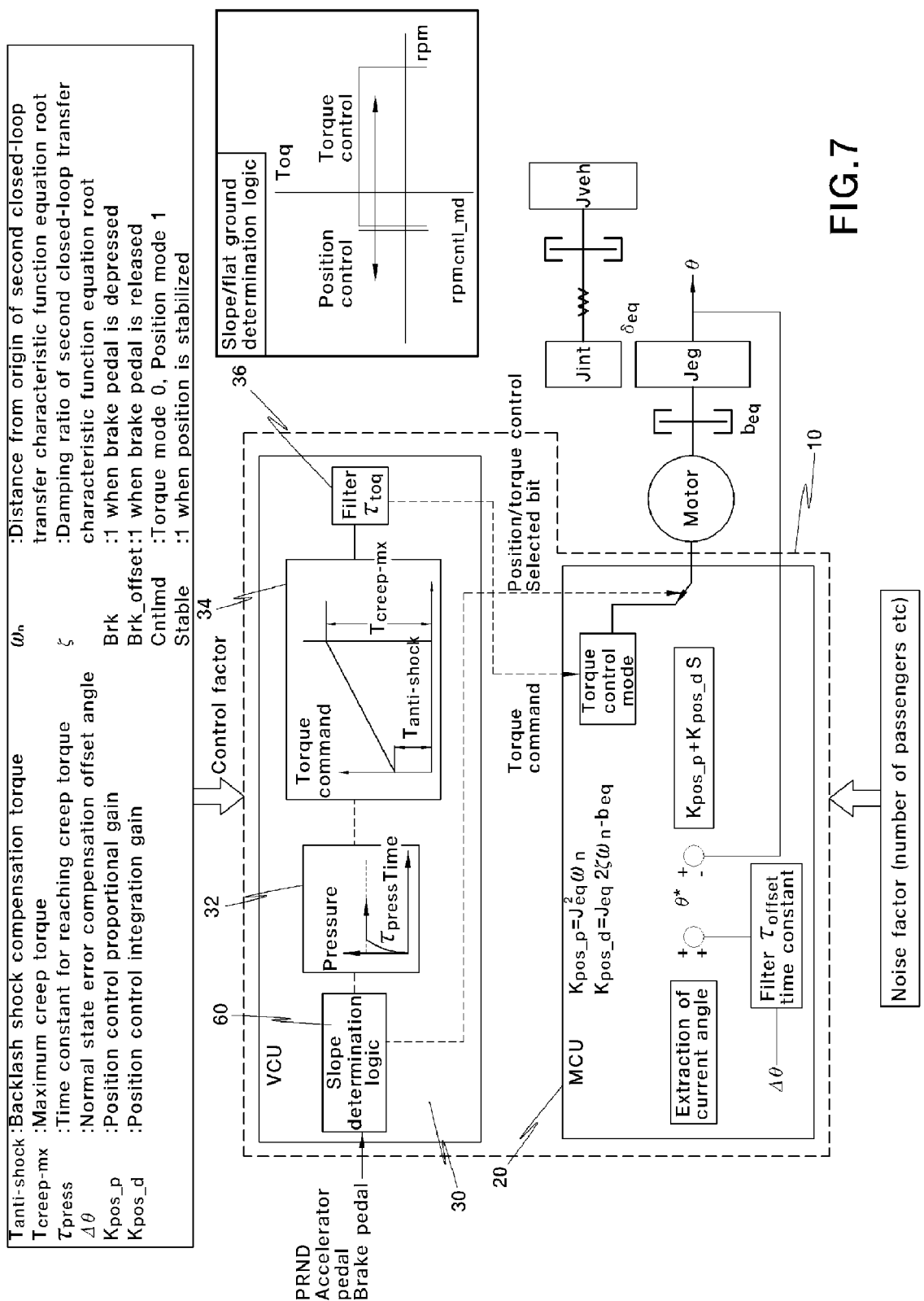
FIG. 7 is an exemplary control block diagram illustrating an apparatus for controlling motor position and creep of an electric vehicle in accordance with a third embodiment of the present invention.

FIG. 7 is a control block diagram illustrating an apparatus for controlling motor position and creep of an electric vehicle in accordance with preferred embodiments of the present invention.

In particular preferred embodiments, the present invention aims at providing a motor position closed-loop control method to suitably maintain the position of a motor (motor rotor) when a vehicle runs on a slope while making up for the disadvantages of a conventional motor torque open-loop control. Preferably, in the motor position closed-loop control, when the vehicle is suitably stopped after a brake pedal is applied, a shock prevention mode is suitably performed to prevent a shock by applying backlash compensation torque and, at the same time, a rolling determination logic is executed. Preferably, upon release of the brake pedal, the vehicle is automatically switched to a position control mode in which a motor torque for maintaining the current position by an appropriate control, such as PID control, PD control, etc. is automatically calculated based on the current position of the motor and the motor torque is used to maintain the position of the vehicle.

In certain preferred embodiments, the apparatus 10 for controlling the motor position and creep of an electric vehicle in accordance with the present invention comprises a rolling determiner 60, a motor position controller 20, and a creep torque controller 30.

In other preferred embodiments, the rolling determiner 40 determines whether or not the vehicle is rolling backwards upon release of the brake pedal after the vehicle is stopped and preferably comprises a gear shift detector for suitably detecting the gear in a forward position and a wheel rotation direction detector for detecting the wheels rotating backwards.

Preferably, the motor position controller 20 controls the motor position (motor rotor) by setting a target input angle by adding the current angle of the motor at a point of time when entering a motor position control mode and an offset angle for compensating for an angle error in a normal state and automatically calculating a motor torque for maintaining the position of the vehicle, i.e., the position of the motor by inputting a difference between the current angle and the target input angle into a PD controller.

According to further preferred embodiments, the creep torque controller 30 comprises a torque converter hydraulic pressure formation modeling unit 32 for forming the same hydraulic pressure as an actual torque converter and a torque converter normal state modeling unit 34. Preferably, the torque converter hydraulic pressure formation modeling unit 32 generates a creep torque of the motor after a time delay when a driver removes his or her foot from the brake pedal while the vehicle is stopped by depressing the brake pedal.

Accordingly, during the torque converter hydraulic pressure formation process by the torque converter hydraulic formation modeling unit 32, the creep torque of the motor appears after a time delay.

In certain preferred embodiments, the torque converter normal state modeling unit 34 preferably provides the characteristics that a motor torque transmission force suitably increases with an increase in a difference between the speeds of the input and output ends of the torque converter hydraulic pressure formation modeling unit 32. Preferably, the torque converter normal state modeling unit 34 serves to suitably decrease the torque according to an increase in speed in order to maintain the speed of the motor at a constant level and, as a result, adjust the motor creep torque to such a level that makes the motor speed constant.

Preferably, a filter 36 for adjusting the creep torque so as not to cause an abrupt change is additionally connected to the final torque output end of the creep torque controller 30.

Figure 8A:
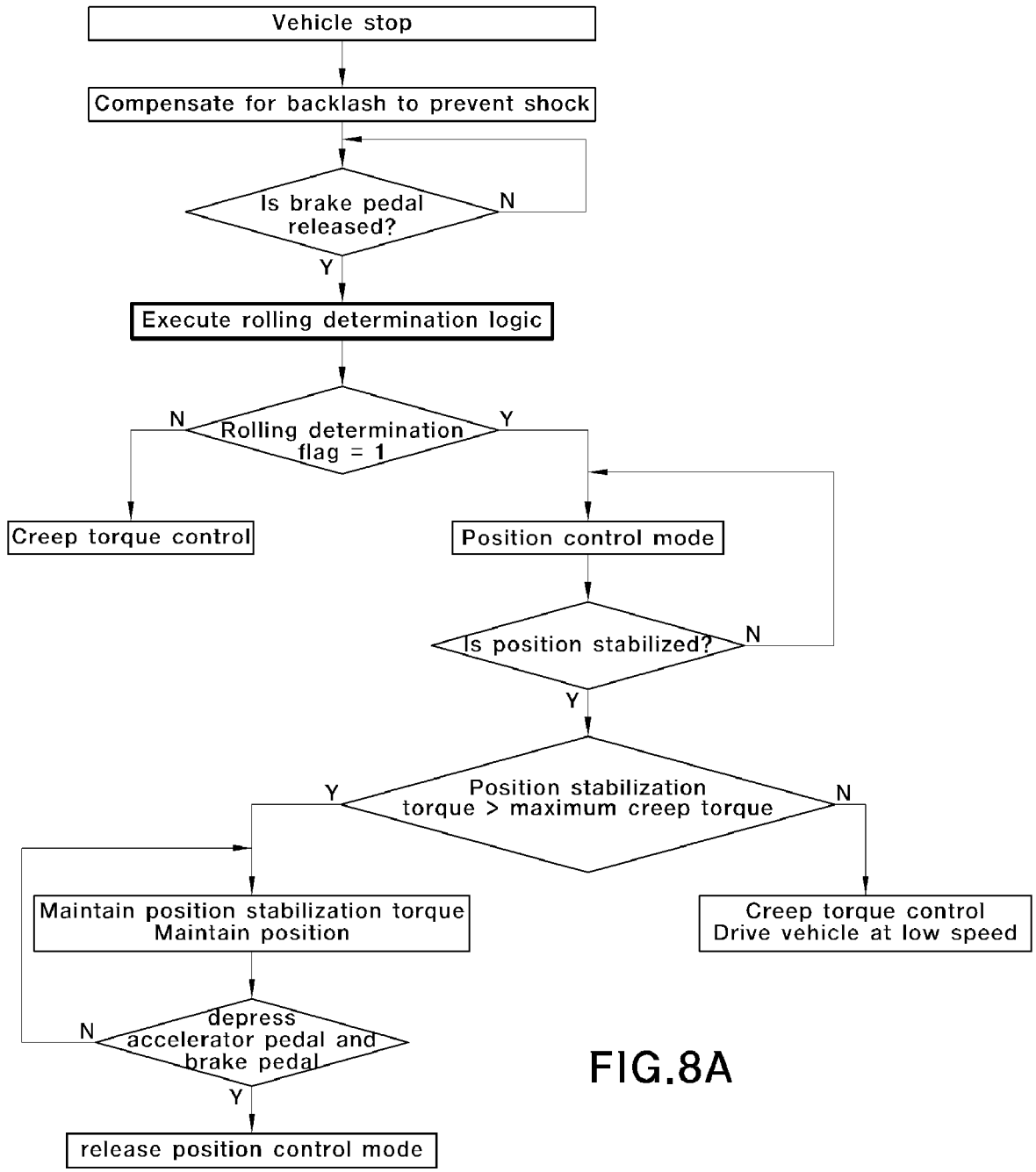
FIGS. 8A and 8B are flowcharts illustrating a method for controlling motor position and creep of an electric vehicle in accordance with the third embodiment of the present invention.
Figure 8B:
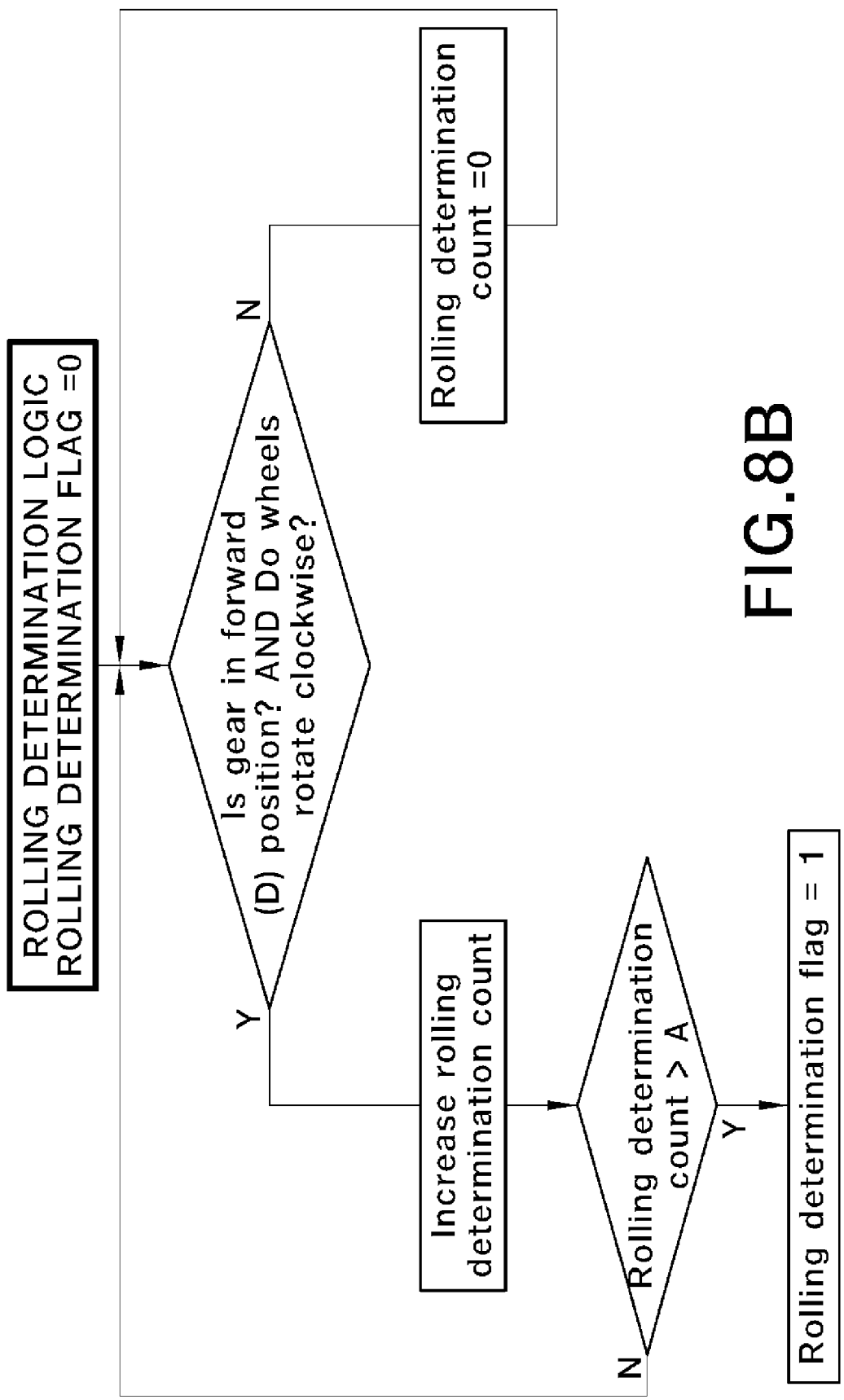
Figure 9:
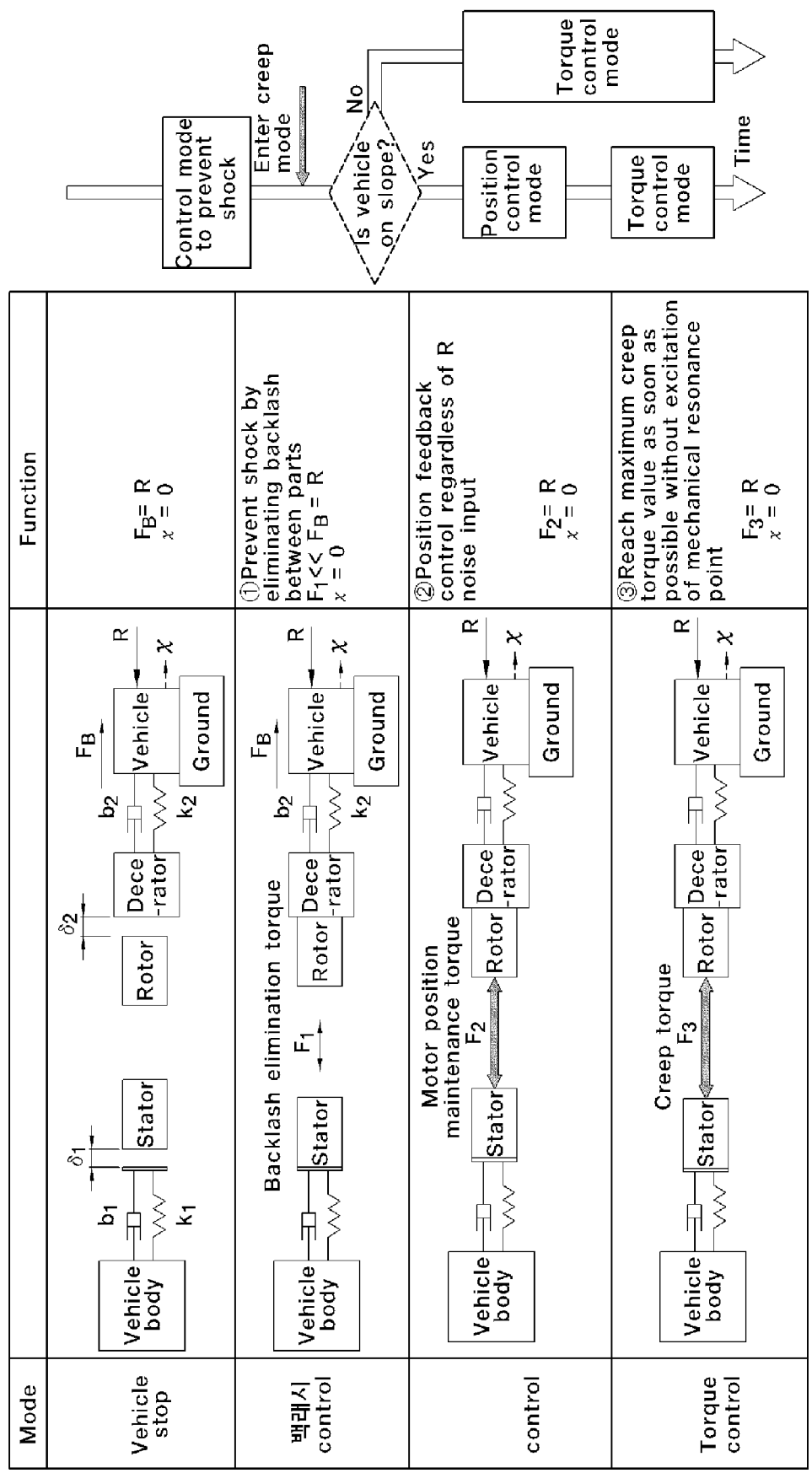
FIG. 9 is an exemplary control block diagram illustrating the method for controlling the motor position and creep of an electric vehicle with respect to control modes in accordance with the third embodiment of the present invention.
Figure 10:
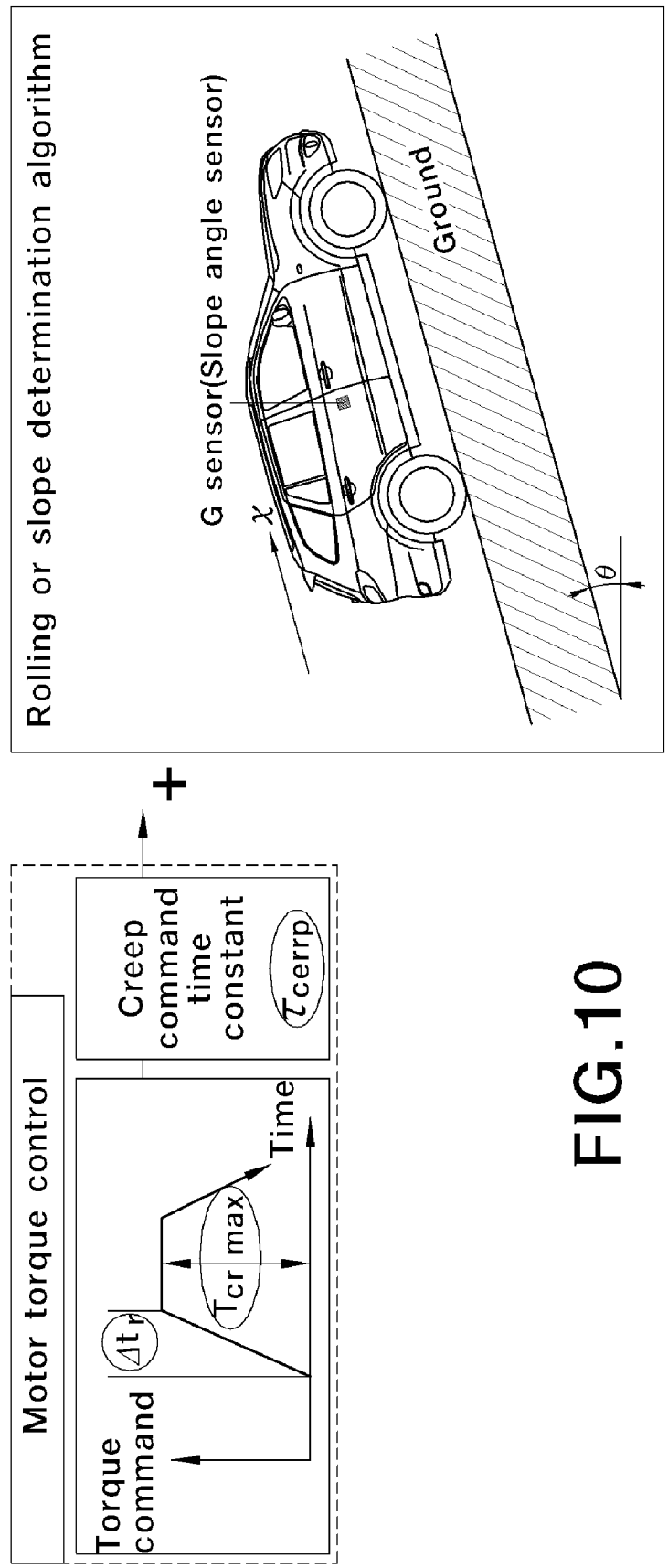
FIG. 10 is a schematic diagram illustrating an example of using a slope angle sensor or rolling determination algorithm in a conventional electric vehicle.
Figure 11:
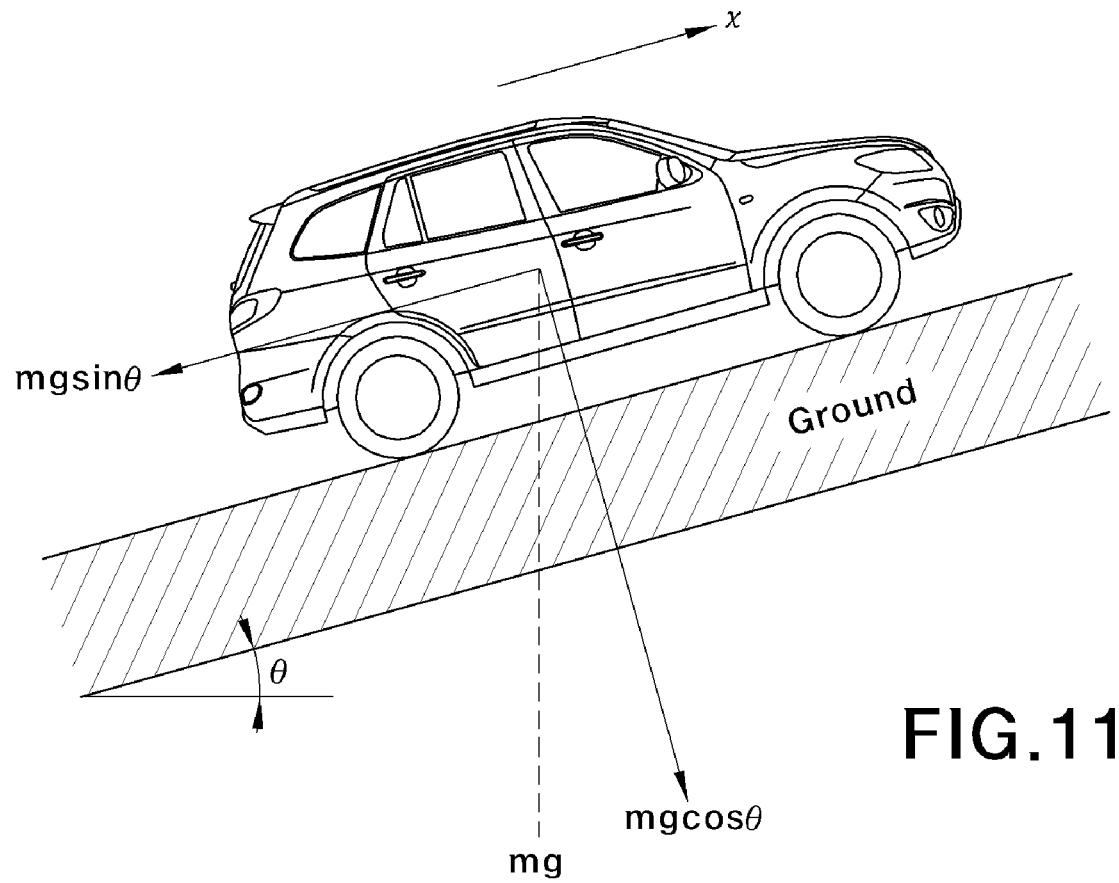
FIG. 11 is a schematic diagram illustrating a state in which a vehicle encounters a slope resistance while running on a slope.

FIGS. 8A and 8B are flowcharts illustrating a method for controlling a creep running of an electric vehicle in accordance with certain preferred embodiments of the present invention, and FIG. 9 is a control block diagram illustrating the method for controlling the creep running of an electric vehicle with respect to control modes in accordance other preferred embodiments of the present invention, in which a change in control modes according to the lapse of time and a variation in motor driving torque according to the change of the control modes are shown.

According to certain preferred embodiments, a logic for the following creep running control performed by the creep torque controller and the motor position controller is meant to be an example, and various control logics can be implemented as far as they have a creep torque generation mode and a motor position holding mode.

The present invention aims at preventing the vehicle from rolling backwards or suddenly starting on a slope without operating the brake pedal and the accelerator pedal, even in an electric vehicle driven only by a motor, by performing a backlash compensation control step for eliminating backlash to prevent a shock caused by the backlash upon stopping of the vehicle by depressing the brake pedal, a rolling determination step of suitably determining whether or not the vehicle is rolling backwards upon release of the brake pedal, a motor position control step in which, if it is determined that the vehicle is not rolling backwards, the vehicle enters a creep torque control mode, and if it is suitably determined that the vehicle is rolling backwards, the motor torque is suitably increased to maintain the motor position, a motor position stabilization check step, and a creep torque control step.

According to preferred embodiments, in the backlash compensation control step for unconditionally eliminating backlash upon stopping of the vehicle when the brake pedal is suitably depressed while running on a slope, a control for preventing a shock caused by the backlash is preferably carried out.

Preferably, if a motor torque is abruptly applied when there is backlash between the motor and a decelerator or between the decelerator and driving wheels, an intense shock is applied toward the decelerator, which shakes the vehicle body, thus reducing the riding comfort. Preferably, the motor position control is suitably carried out beforehand to compensate for the backlash when the vehicle is stopped.

Accordingly, in order to compensate for an error between the current angle of the motor and a normal state angle, which is caused by the backlash between the motor rotor and the decelerator, that is, in order to eliminate the backlash upon stopping of the vehicle when the brake pedal is depressed during running, the backlash compensation control step including calculating a motor torque by taking the backlash into account to prevent a shock and applying a torque enough to eliminate the backlash to the motor is performed.

According to further preferred embodiments, the motor torque for eliminating the backlash to compensate for the motor position error caused by the backlash occurring when the brake pedal is depressed, that is, the motor driving force (F1 in FIG. 9), is required in a small amount to eliminate the backlash.

In further preferred embodiments, when the driver removes his or her foot from the brake pedal while the control for preventing a shock caused by the backlash has been carried out, if the vehicle is on a slope, a slope load is produced abruptly. Preferably, the slope determination step is performed to suitably determine whether or not the vehicle is rolling backwards.

Preferably, it is determined whether the vehicle is on a slope or flat ground upon release of the brake pedal. In further preferred embodiments, whether the vehicle is rolling backwards may be determined by executing a rolling determination logic based on the gear position and the motor rotation direction. Moreover, the vehicle is switched to one of two different operation modes based on whether or not the vehicle is rolling backwards, and if it is determined that the vehicle is rolling backwards (i.e., if it is determined that the vehicle is on a slope), the motor position control for maintaining the motor position is performed regardless of external load noise to generate a torque required to maintain the motor position.

Accordingly, if it is determined that the vehicle is not rolling backwards, the vehicle enters the creep torque control mode, and if it is determined that the vehicle is rolling backwards, the motor position control step for increasing the motor torque is carried out to suitably maintain the motor position.

In particular preferred embodiments, in the rolling determination step, if a gear shift detector suitably detects a gear shift lever in a forward position (D position) and a wheel rotation direction detector detects wheels rotating backwards, a rolling determination count is increased. If the rolling determination count is greater than a rolling determination reference count value, it is finally determined that the vehicle is rolling backwards. Preferably, once it is determined that the vehicle is rolling backwards, the motor position control mode for increasing the motor torque to a calculated level is carried out to maintain the motor position.

In other certain embodiments, the motor torque for maintaining the motor position is calculated by a process of setting a target input angle by adding the current angle of the motor at a point of time when entering the motor position control mode and an offset angle for compensating an angle error in a normal state and a process of calculating a motor torque for maintaining the position of the motor by inputting a difference between the current angle and the target input angle into a PD controller. The torque calculated to a level that maintains the motor position is applied to the motor, thus performing the motor position control.

In other certain embodiments, if it is determined that the vehicle is not rolling backwards, the following creep torque control is performed.

Accordingly regardless of a slope load that causes the vehicle to roll backwards on a slope, the motor position control for maintaining the stopped position of the vehicle, i.e., the current position of the motor is carried out, thus issuing a torque command to increase the motor torque to a level that maintains the current position of the motor.

Accordingly, as the slope load is abruptly applied to the vehicle upon release of the brake pedal, the motor torque for maintaining the motor position during the motor position control mode, that is, the motor driving force (F2 in FIG. 9) is increased, thus allowing the vehicle to be continuously kept in the stopped state even on the slope.

In further preferred embodiments, after a predetermined time, the motor position stabilization check step is carried out in the following manner.

Preferably, the motor position stabilization check step is performed to check whether or not there is any change in motor torque and position and to determine whether to constantly maintain the current position of the vehicle, i.e., the current position of the motor or to switch to the creep torque control mode.

According to preferred embodiments of the present invention, for the motor position stabilization check, firstly, if the change in the motor torque is suitably less than a motor torque stabilization reference value or the change in the motor position is less than a motor position stabilization reference value, a stabilization determination count is increased. Preferably, if the stabilization determination count is greater than a stabilization determination reference count value, it is determined that the motor position is stably maintained.

Accordingly, the motor position stabilization check step is suitably started after release of the brake pedal, and if it is checked that the motor position is stably maintained, it is determined whether to switch to the creep torque control mode or not.

Preferably, in the case where it is determined that the motor position is stabilized, if a stabilization torque for maintaining the motor position is less than the maximum creep torque, the vehicle is suitably switched to the creep torque control mode, in which, as the motor torque slowly increases from the stabilization torque for maintaining the motor position to the maximum creep torque, the creep torque control is carried out.

In further preferred embodiments, if the stabilization torque for maintaining the motor position is less than the creep torque, the vehicle is suitably switched to the creep torque control step, in which, when the motor torque (F3 in FIG. 9) increases from the stabilization torque for maintaining the motor position to the maximum creep torque, the vehicle is slowly moved. In other preferred embodiments, in the case where the stabilization torque for maintaining the motor position is greater than the creep torque, the motor position is not changed but is continuously maintained.

Accordingly, the control for maintaining the motor position and the creep torque control are cancelled when the accelerator pedal or the brake pedal is depressed.

Accordingly, when the electric vehicle driven only by the motor runs on a slope, the current position of the vehicle, i.e., the position of the motor is correctly maintained regardless of the number of passengers or slope angle, and then the vehicle is switched to the creep torque control mode. Preferably, even when the vehicle is restarted after a stop on a slope, it can run without rolling backwards or sudden starting, thereby greatly improving the driving performance.

As described herein, when the brake pedal is suitably released after an electric vehicle driven only by a motor is stopped, the motor position control for maintaining the vehicle in the stopped position is performed, the motor position stabilization is checked while the vehicle is in the stopped position, and then the creep torque control is performed such that the current position of the vehicle on a slope is maintained without operating the brake pedal or the accelerator pedal and regardless of the change in slope angle, the number of passengers, etc., and the vehicle is prevented from rolling backwards or suddenly starting, thus suitably improving the driving safety.

In further preferred embodiments, when an electric vehicle driven only by a motor is stopped, a shock prevention mode is performed to prevent a shock by applying backlash compensation torque and, at the same time, a slope determination logic is executed. Preferably, upon release of the brake pedal, the motor position control for maintaining the vehicle in the stopped position or the creep torque control is performed. Further, even after release of the brake pedal, the motor position stabilization is checked in the stopped position of the vehicle to perform the creep torque control such that the current position of the vehicle on a slope is maintained without operating the brake pedal or the accelerator pedal and regardless of the change in slope angle, the number of passengers, etc., and the vehicle is prevented from rolling backwards or suddenly starting, thus improving the driving safety.

In further preferred embodiments, the motor position control is suitably performed by applying the motor torque for maintaining the motor position before the vehicle is rolling backwards through the detection of the slope angle sensor and the slope determination logic using the detection result. Preferably, a torque corresponding to the slope load calculated based on the slope angle is further applied to the motor torque, thus stabilizing the motor position within a short time.

In further related embodiments, when an electric vehicle driven only by a motor is suitably stopped, a shock prevention mode is suitably performed to prevent a shock by applying backlash compensation torque and, at the same time, a rolling determination logic is executed. Preferably, upon release of the brake pedal, the motor position control for maintaining the vehicle in the stopped position or the creep torque control is performed. Further, even after release of the brake pedal, the motor position stabilization is checked in the stopped position of the vehicle to perform the creep torque control such that the current position of the vehicle on a slope is maintained without operating the brake pedal or the accelerator pedal and regardless of the change in slope angle, the number of passengers, etc., and the vehicle is prevented from rolling backwards or suddenly starting, thus improving the driving safety.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for controlling motor position and creep of an electric vehicle, the apparatus comprising:
    a motor position determiner for determining the duration of motor position control from the stop of the vehicle to a predetermined time after release of a brake pedal;
    a motor position controller for maintaining the position of a motor by calculating a motor torque for maintaining the position of the motor; and
    a creep torque controller for generating a creep torque of the motor after a time delay and controlling the motor speed to be at a constant level.

2. The apparatus of claim 1, wherein the motor position controller sets a target input angle by adding a motor position angle at a point of time when entering a position control mode and a backlash compensation angle and automatically calculates a torque for maintaining the position of the motor by inputting a difference between the motor position angle at the point of time when entering the position control mode and the target input angle into a PD controller.

3. The apparatus of claim 1, wherein the creep torque controller comprises:
    a torque converter hydraulic pressure formation modeling unit for generating the creep torque of the motor after a time delay; and
    a torque converter normal state modeling unit for controlling the creep torque of the motor to a level that maintains the motor speed constant.

4. The apparatus of claim 1, wherein a filter for adjusting the creep torque so as not to cause an abrupt change is connected to a final torque output end of the creep torque controller.

5. A method for controlling motor position and creep of an electric vehicle, the method comprising:
    a motor position control step of controlling backlash compensation to eliminate backlash when a brake pedal is depressed during running and then applying a motor torque to maintain the position of a motor when the brake pedal is released;
    a motor position stabilization check step of checking whether to continue to maintain the motor position or to enter a creep torque control step after a predetermined time; and
    the creep torque control step of constantly increasing the motor torque from a stabilization torque for maintaining the motor position to a maximum creep torque.

6. The method of claim 5, wherein the motor position control step comprises:
    setting a target input angle by adding a motor position angle at a point of time when entering the position control step and a backlash compensation angle;
    calculating a motor torque for maintaining the position of the motor by inputting a difference between the motor position angle at the point of time when entering the position control step and the target input angle into a PD controller; and
    applying the torque calculated to a level that maintains the motor position to the motor.

7. The method of claim 5, wherein the motor position stabilization check step comprises:
    determining that the motor position is stably maintained by increasing a stabilization determination count if a change in the motor torque is less than a motor torque stabilization reference value or if a change in the motor position is less than a motor position stabilization reference value; and
    determining whether to switch to the creep torque control step or not.

8. The method of claim 7, wherein, if the stabilization torque for maintaining the motor position is less than the maximum creep torque, the vehicle is switched to the creep torque control mode, and if the stabilization torque for maintaining the motor position is greater than the creep torque, the motor position is maintained.

9. The method of claim 5, wherein the motor position control and the creep torque control are cancelled immediately when an accelerator pedal or the brake pedal is depressed.

10. An apparatus for controlling motor position and creep of an electric vehicle, the apparatus comprising:
    a slope determiner for determining whether to enter a motor position control mode or a creep torque control mode based on detection information of a slope angle sensor detecting a slope angle of a traveling road upon release of a brake pedal after the vehicle is stopped;
    a motor position controller for maintaining the position of a motor by calculating a motor torque; and
    a creep torque controller for generating a creep torque of the motor after a time delay and controlling the motor speed to be at a constant level.

11. The apparatus of claim 10, wherein the motor position controller sets a target input angle by adding the current angle of the motor at a point of time when entering the motor position control mode and an offset angle for compensating for an angle error in a normal state and automatically calculates a motor torque for maintaining the position of the vehicle, i.e., the position of the motor by inputting a difference between the current angle and the target input angle into a PD controller.

12. The apparatus of claim 10, wherein the creep torque controller comprises:
    a torque converter hydraulic pressure formation modeling unit for generating the creep torque of the motor after a time delay; and
    a torque converter normal state modeling unit for controlling the creep torque of the motor to a level that maintains the motor speed constant.

13. The apparatus of claim 10, wherein a filter for adjusting the creep torque so as not to cause an abrupt change is connected to a final torque output end of the creep torque controller.

14. A method for controlling motor position and creep of an electric vehicle, the method comprising:
    a slope determination step of determining whether to enter a motor position control step or a creep torque control step by measuring a slope angle of a traveling road and determining whether the slope angle is enough to make the vehicle roll backwards upon release of a brake pedal;
    the motor position control step of entering the creep torque control step if the slope angle is less than a reference slope angle for the slope determination and increasing the motor torque to maintain the motor position if the slope angle is greater than the reference slope angle for the slope determination;

a motor position stabilization check step of checking whether to continue to maintain the motor position or to enter the creep torque control step after a predetermined time; and a creep torque control step of constantly increasing the motor torque from a stabilization torque for maintaining the motor position to a maximum creep torque.

15. The method of claim 14, further comprising a backlash compensation control step including calculating a motor torque by taking backlash into account to prevent a shock caused by the backlash and to eliminate the backlash upon stopping of the vehicle when the brake pedal is depressed during running and applying a torque enough to eliminate the backlash to the motor.

16. The method of claim 14, wherein, in the slope determination step, the level of the slope angle is determined by a slope angle sensor.

17. The method of claim 14, wherein the motor position control step comprises:
setting a target input angle by adding the current angle of the motor at a point of time when entering the motor position control step and an offset angle for compensating for an angle error in a normal state;
calculating a motor torque for maintaining the position of the motor by inputting a difference between the current angle and the target input angle into a PD controller; and
applying a final motor torque, obtained by adding the calculated motor torque and a torque corresponding to a slope load value (mgsinθ) detected by the slope angle sensor and provided as a feedforward input to the motor.

18. The method of claim 14, wherein the motor position stabilization check step comprises:
determining that the motor position is stably maintained by increasing a stabilization determination count if a change in the motor torque is less than a motor torque stabilization reference value or if a change in the motor position is less than a motor position stabilization reference value; and
determining whether to switch to the creep torque control step or not.

19. The method of claim 18, wherein, if the stabilization torque for maintaining the motor position is less than the maximum creep torque, the vehicle is switched to the creep torque control mode, and if the stabilization torque for maintaining the motor position is greater than the creep torque, the motor position is maintained.

20. The method of claim 14, wherein the motor position control and the creep torque control are cancelled immediately when an accelerator pedal or the brake pedal is depressed.

21. An apparatus for controlling motor position and creep of an electric vehicle, the apparatus comprising:
a rolling determiner for determining whether or not the vehicle is rolling backwards upon release of a brake pedal after the vehicle is stopped;
a motor position controller for maintaining the position of a motor by calculating a motor torque; and
a creep torque controller for generating a creep torque of the motor after a time delay and controlling the motor speed to be at a constant level.

22. The apparatus of claim 21, wherein the rolling determiner comprises:
a gear shift detector for detecting a gear in a forward position; and
a wheel rotation direction detector for detecting wheels rotating backwards.

23. The apparatus of claim 21, wherein the motor position controller sets a target input angle by adding the current angle of the motor at a point of time when entering a motor position control mode and an offset angle for compensating for an angle error in a normal state, and automatically calculates a motor torque for maintaining the position of the vehicle, i.e., the position of the motor by inputting a difference between the current angle and the target input angle into a PD controller.

24. The apparatus of claim 21, wherein the creep torque controller comprises:
a torque converter hydraulic pressure formation modeling unit for generating the creep torque of the motor after a time delay; and
a torque converter normal state modeling unit for controlling the creep torque of the motor to a level that maintains the motor speed constant.

25. The apparatus of claim 21, wherein a filter for adjusting the creep torque so as not to cause an abrupt change is connected to a final torque output end of the creep torque controller.

26. A method for controlling motor position and creep of an electric vehicle, the method comprising:
a rolling determination step of determining whether or not the vehicle is rolling backwards upon release of a brake pedal;
a motor position control step of entering a creep torque control step if it is determined that the vehicle is not rolling backwards and applying a torque for maintaining the position of a motor if it is determined that the vehicle is rolling backwards;
a motor position stabilization check step of checking whether to continue to maintain the motor position or to enter the creep torque control step after a predetermined time; and
a creep torque control step of constantly increasing the motor torque from a stabilization torque for maintaining the motor position to a maximum creep torque.

27. The method of claim 26, further comprising a backlash compensation control step including calculating a motor torque by taking backlash into account to prevent a shock caused by the backlash and to eliminate the backlash upon stopping of the vehicle when the brake pedal is depressed during running and applying a torque enough to eliminate the backlash to the motor.

28. The method of claim 26, wherein the rolling determination step comprises:
detecting wheels rotating backwards while a gear shift lever is in a forward (D) position; and
increasing a rolling determination count and determining that the vehicle is rolling backwards if the rolling determination count is greater than a rolling determination reference count value.

29. The method of claim 26, wherein the motor position control step comprises:
setting a target input angle by adding the current angle of the motor at a point of time when entering a motor position control step and an offset angle for compensating for an angle error in a normal state;
calculating a motor torque for maintaining the position of the motor by inputting a difference between the current angle and the target input angle into a PD controller; and
applying a torque increased to a level that maintains the motor position to the motor.

30. The method of claim 26, wherein the motor position stabilization check step comprises:

determining that the motor position is stably maintained by increasing a stabilization determination count if a change in the motor torque is less than a motor torque stabilization reference value or if a change in the motor position is less than a motor position stabilization reference value; and determining whether to switch to the creep torque control step or not.

31. The method of claim 30, wherein, if the stabilization torque for maintaining the motor position is less than the maximum creep torque, the vehicle is switched to the creep torque control mode, and if the stabilization torque for maintaining the motor position is greater than the creep torque, the motor position is maintained.

32. The method of claim 26, wherein the motor position control and the creep torque control are cancelled immediately when an accelerator pedal or the brake pedal is depressed.

33. An apparatus for controlling motor position and creep of an electric vehicle, the apparatus comprising:

a motor position determiner for determining the duration of motor position control from the stop of the vehicle to a time after release of a brake pedal;

a motor position controller for maintaining the position of a motor by calculating a motor torque for maintaining the position of the motor; and a creep torque controller for generating a creep torque of the motor.

34. The apparatus of claim 33, wherein the creep torque controller generates a creep torque after a time delay and controls the motor speed to be at a constant level.

* * * * *